United States Patent [19]

Watanabe et al.

[11] Patent Number: 5,441,456
[45] Date of Patent: Aug. 15, 1995

[54] PRESS-FORMED PULLEY

[75] Inventors: Satomi Watanabe; Takeshi Miyazaki; Yutaka Ito; Toshikazu Amano, all of Inazawa, Japan

[73] Assignee: Toyoda Gosei Co., Ltd., Nishikasugai, Japan

[21] Appl. No.: 83,696

[22] Filed: Jun. 30, 1993

[30] Foreign Application Priority Data

Jul. 9, 1992 [JP] Japan .................. 4-206070

[51] Int. Cl.$^6$ .................................... F16D 3/00
[52] U.S. Cl. ........................ 474/94; 474/902; 29/892.11
[58] Field of Search ............. 474/94, 166, 174–178, 474/902, 903; 29/892, 892.11, 892.3, 893.34

[56] References Cited

U.S. PATENT DOCUMENTS

| | | | |
|---|---|---|---|
| 1,454,435 | 5/1923 | Garside | 29/892.11 X |
| 2,827,225 | 3/1958 | Killian | 29/892.11 X |
| 3,834,309 | 11/1974 | Nuss | 29/892.11 |
| 4,079,492 | 3/1978 | Fromme | 29/892.11 |
| 4,131,032 | 12/1978 | Warland et al. | 29/893.34 X |
| 4,231,265 | 11/1980 | Hanisch et al. | 474/903 X |
| 4,411,639 | 10/1983 | Ruther | 474/166 X |
| 4,470,290 | 9/1984 | Jungesjo | 29/893.34 X |
| 4,534,749 | 8/1985 | Hans et al. | 474/174 |
| 4,547,179 | 10/1985 | Ohhashi | 29/892.11 X |
| 4,882,944 | 11/1989 | Vohl | 474/166 X |

Primary Examiner—Roger J. Schoeppel
Attorney, Agent, or Firm—Cushman, Darby & Cushman

[57] ABSTRACT

A lightweight pulley is provided which can be produced in a simple manner at low cost. The pulley has a cylindrical boss portion, an annular main portion which extends radially outwardly from the cylindrical boss portion, and a ring-shaped belt retaining portion. The boss portion and the main portion are integrally formed from a thin metal plate by press-forming, thereby reducing the weight of the pulley, and facilitating the production thereof. The peripheral wall of the boss portion is alternately bent inwardly and outwardly in its peripheral direction to form a plurality of ribs, thus increasing the strength of the boss portion. A method of manufacturing the pulley is also provided.

8 Claims, 4 Drawing Sheets

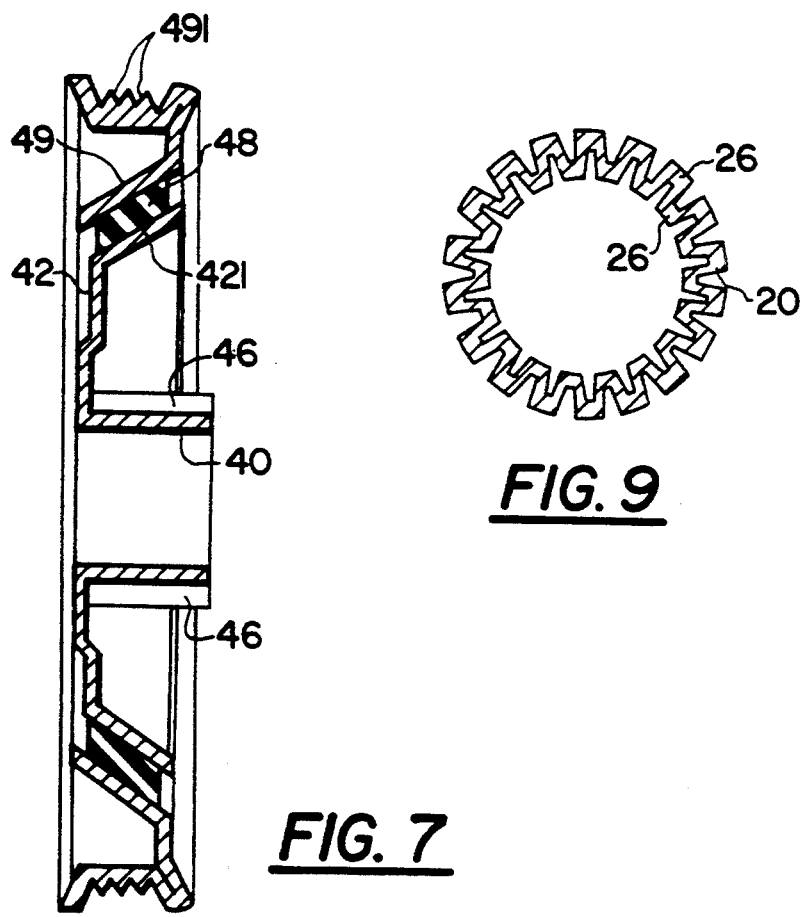
FIG. 7
FIG. 9
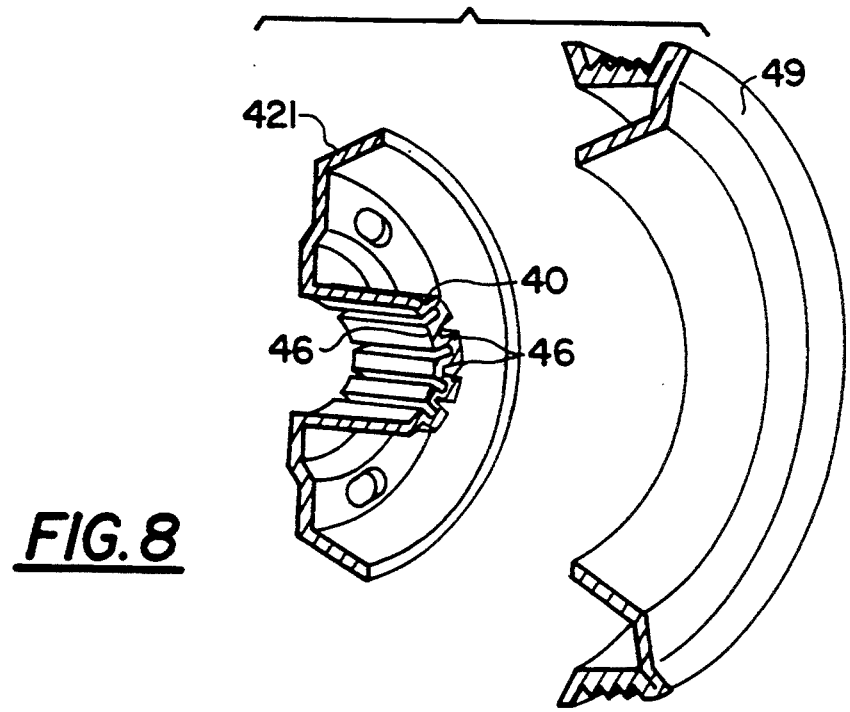
FIG. 8 ns. 5,441,456

PRESS-FORMED PULLEY

BACKGROUND OF THE INVENTION

1. Field of the Invention

The present invention relates to a pulley, and more particularly to a pulley which is lightweight and can be produced in a simple manner.

2. Description of Related Art

FIG. 1 illustrates a conventional pulley which acts as a damper pulley. As shown, a cylindrical boss portion 10, to be press-fitted onto a rotary shaft (not shown), and an annular main portion 12, provided outside the cylindrical boss portion 10 are integrally formed by machining a cast metal. A metallic ring body 16, acting as a damper mass, is joined to the outer periphery of the main portion 12 via rubber body 14. V-shaped grooves 18 are formed in the outer periphery of the metallic ring body 16. Thus, the metallic ring body 16 also serves as a belt retaining portion of the pulley.

The pulley formed of cast metal is large in thickness, and accordingly has substantial weight, and also requires machining work, which increases production costs.

FIG. 2 illustrates another conventional pulley. As shown, in order to reduce both the weight and production cost thereof, the main portion 12 and the belt retaining portion 19 are integrally formed from a thin metal plate by press-forming. However, the cylindrical boss portion 10 is formed separately, from a thick metal plate and is coupled to the main portion 12. The boss portion 10 is made thick, since it requires a high strength, as compared to the remaining portions.

The conventional pulley of FIG. 2 requires a troublesome welding process to secure the cylindrical boss portion 10 to the main portion 12, thus increasing production costs. In addition, with this conventional pulley, the weight cannot be sufficiently reduced.

SUMMARY OF THE INVENTION

It is an object of the present invention to provide a lightweight pulley which can be produced in a simple manner at low cost.

A pulley in accordance with the present invention has a cylindrical boss portion adapted to be press-fitted onto a rotary shaft, a ring-shaped belt retaining portion which is concentrically disposed about the boss portion, and a plate-shaped main portion which connects the boss portion and the belt retaining portion. At least the boss portion and the main portion are integrally formed of a thin metal plate by press-forming. The boss portion has a plurality of ribs which are formed by alternately bending its peripheral wall inwardly and outwardly in the circumferential direction thereof.

The pulley, provided in accordance with the present invention, can be manufactured inexpensively and is of reduced weight, since at least the boss portion and the main portion are integrally formed from a thin metal plate.

Furthermore, sufficient strength of the boss portion can be obtained by virtue of the ribs formed in its peripheral wall.

Other objects, features and characteristics of the present invention will become apparent upon consideration of the following description and the appended claims with reference to the accompanying drawings, all of which form a part of the specification.

BRIEF DESCRIPTION OF THE DRAWINGS

FIG. 7 is a longitudinal sectional view of a third embodiment of a pulley provided in accordance with the principles of the present invention;

FIG. 8 is a partial cutaway perspective view of the pulley of FIG. 7; and

FIG. 9 is a cross-sectional view of the boss portion of the pulley of FIG. 4.

DETAILED DESCRIPTION OF THE PRESENTLY PREFERRED EXEMPLARY EMBODIMENTS

Figure 1:
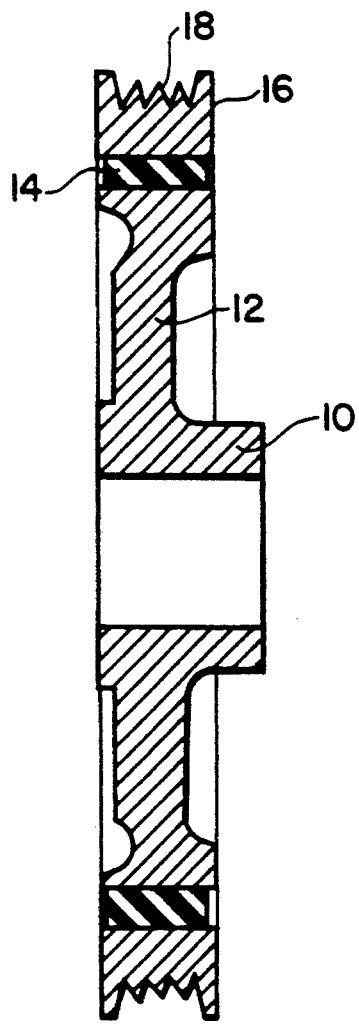
FIG. 1 is a longitudinal sectional view of a conventional pulley.
Figure 2:
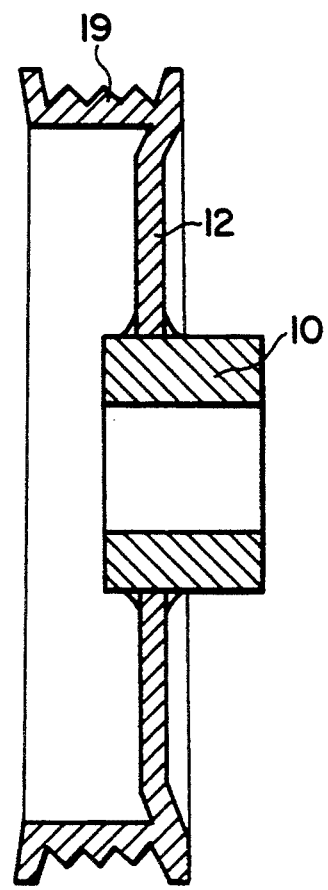
FIG. 2 is a longitudinal sectional view of another conventional pulley.
Figure 3:
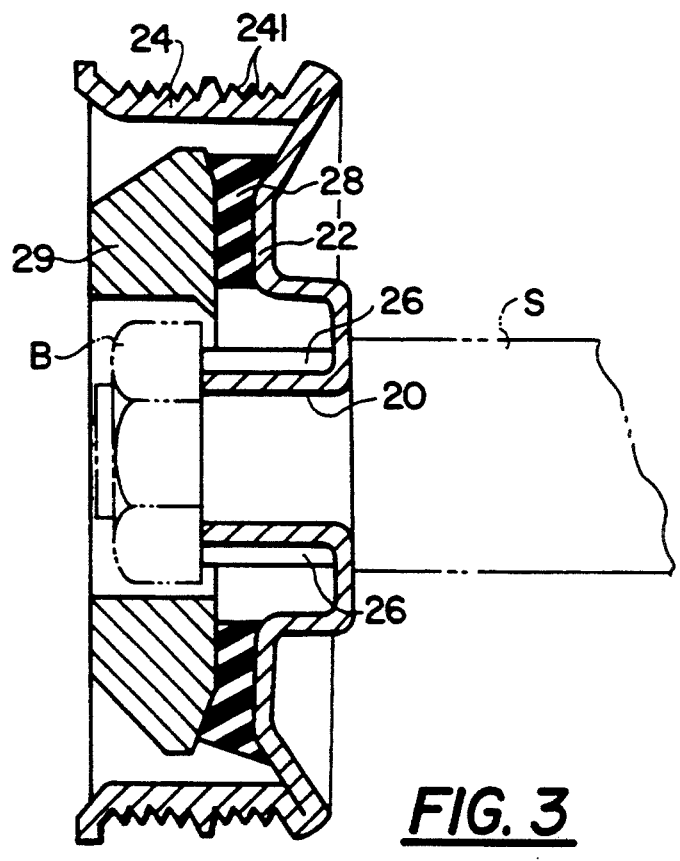
FIG. 3 is a longitudinal sectional view of a first embodiment of a pulley provided in accordance with the principles of the present invention.
Figure 4:
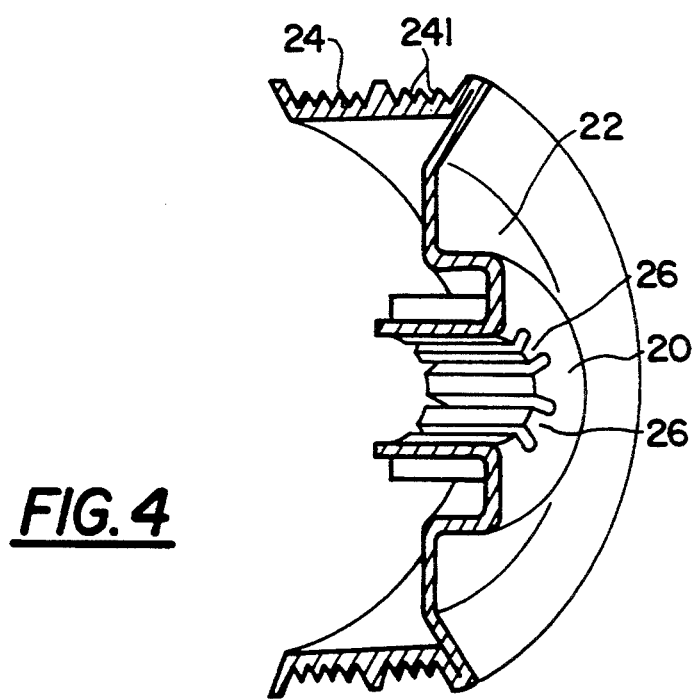
FIG. 4 is a partial cutaway perspective view of the pulley of FIG. 3.

FIGS. 3 and 4 illustrate a first embodiment of a pulley provided in accordance with the principles of the present invention, which acts as a damper pulley. As shown in the drawings, the entire damper pulley is formed of a relatively thin (about 2.8 mm thick) SPCC plate by press-forming. The damper pulley includes a cylindrical boss portion 20 and an annular main portion 22 which extends radially outwardly from one axial end of the cylindrical boss portion 20. The outer peripheral part of the main portion 22 is bent to be substantially perpendicular to the plane surface of the main portion 22, so as to define a ring-shaped belt retaining portion 24 which is concentric with the boss portion 20.

The peripheral wall of the cylindrical boss portion 20 has a substantially U-shaped cross-section. The inner peripheral wall of the boss portion 20 is alternately bent inwardly and outwardly in its circumferential direction to form a plurality of ribs 26 having a nearly rectangular cross-section, as shown in FIG. 4.

An axial end of the rotary shaft S is inserted into the boss portion 20, and is secured thereto by a nut B.

V-shaped grooves 241 are formed in the outer peripheral surface of the belt retaining portion 24, which is parallel to the rotary shaft S.

A ring-shaped rubber body 28 of a uniform thickness is concentrically joined to the planar surface of the main portion 22. A ring-shaped damper-mass member 29 is coupled to the rubber body 28.

When torsional vibrations are exerted from the rotary shaft S, the damper-mass member 29 resonates therewith, thereby absorbing or restraining the exerted torsional vibrations.

With the first embodiment of the pulley having the above-described structure, the cylindrical boss portion 20 formed from a thin metal plate has sufficient strength due to the ribs 26. Thus, the pulley of the first embodiment can be easily produced by press-forming without such troublesome steps of preparing a thick cylindrical boss portion, and securing the boss portion to the main portion of the pulley by welding, which conventionally have been required. Therefore, with the present embodiment, production costs can be reduced.

Figure 5:
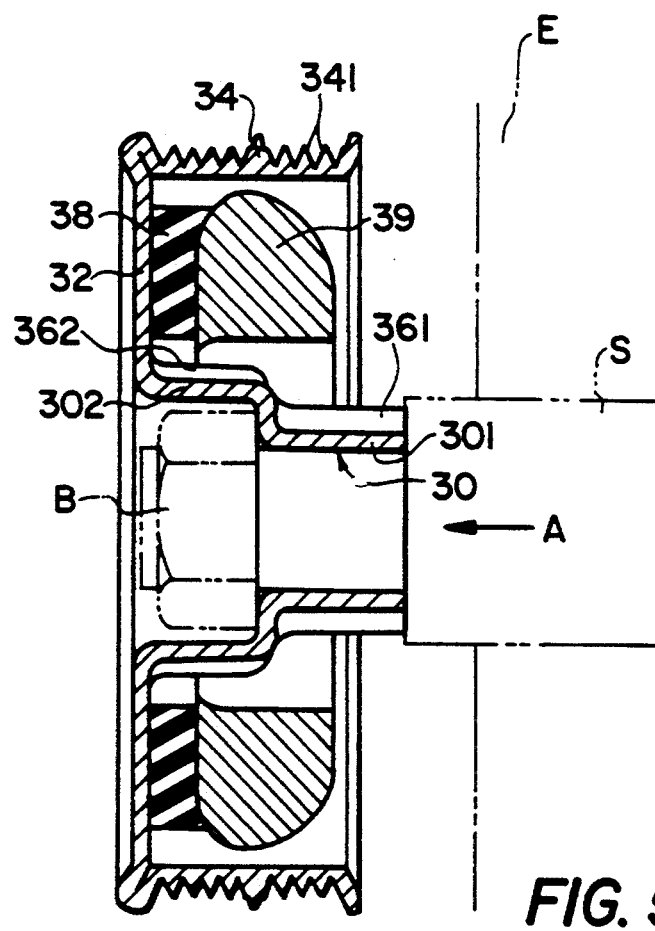
FIG. 5 is a longitudinal sectional view of a second embodiment of a pulley provided in accordance with the principles of the present invention.
Figure 6:
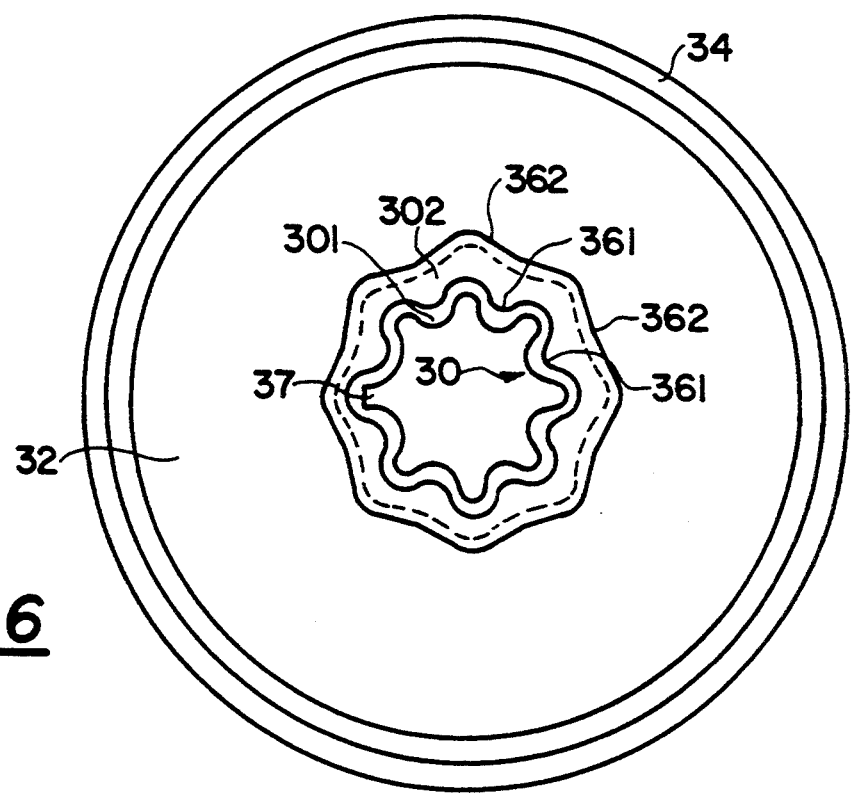
FIG. 6 is a plan view of the pulley of the second embodiment of the invention, shown in the direction of arrow A in FIG. 5.

FIGS. 5 and 6 illustrate a second embodiment of a pulley provided in accordance with the principles of the present invention, which acts as a damper pulley. As shown in the drawings, a cylindrical boss portion 30 includes two portions 301 and 302 of different diameters. An axial end of the rotary shaft S is inserted into the smaller diameter portion 301, and is secured by a nut B which is accommodated within the larger diameter portion 302.

An annular plate-shaped main portion 32 extends radially outwardly from the open end of the larger diameter portion 302 of the boss portion 30. The outer peripheral part of the main portion 32 is bent to be substantially perpendicular to the main portion 32, thereby defining a ring-shaped belt retaining portion 32, which is concentric with the boss portion 30. V-shaped grooves 341 are formed in the outer peripheral surface of the belt-retaining portion 34, which is parallel to the rotary shaft S.

As shown in FIG. 6, the peripheral wall of the boss portion 30 including the smaller diameter portion 301 and the larger diameter portion 302, is alternately bent inwardly and outwardly in its circumferential direction to form a plurality of ribs 361 and 362. Ribs 362 of the larger diameter portion 302 which does not directly receive a load from the rotary shaft S are small, and have shallow V-shaped cross-sections, composed of gently inclined surfaces.

In contrast, ribs 361 of the smaller diameter portion 301 which directly receives a load from the rotary shaft S are large, and have deep U-shaped cross-sections, composed of steeply inclined surfaces. One outwardly bent rib of ribs 361 is formed to have a rectangular cross-section, thereby defining a key-way 37.

As shown in FIG. 5, a ring-shaped damper-mass member 39 is bonded to the planar surface of the main portion 32 via a ring-shaped rubber body 38 of a uniform thickness, which is disposed within a space defined by the boss portion 30 and the belt retaining portion 34.

By virtue of the ribs 361 and 362, the boss portion 30 has sufficient strength, although it is made from a thin metal plate. The ribs 361 respectively have U-shaped cross-sections so that after pressing-forming, the obtained product can be smoothly separated from a die, and accordingly, efficient production of the pulley can be realized.

With the present embodiment, if the rubber body 38 is broken during operation of the pulley, the broken rubber pieces are prevented from scattering outward, because the damper-mass member 39 is directed to a main portion of an engine E, from which the rotary shaft S projects.

In addition, the amount of projection of the pulley in its axial direction can be reduced, because the nut B is accommodated within the larger diameter portion 302 of the boss portion 30.

FIGS. 7 and 8 illustrate a third embodiment of a pulley provided in accordance with the principles of the present invention, which acts as a damper pulley. As shown in the drawings, a cylindrical boss portion 40 and an annular plate-shaped main portion 42 are integrally formed from a thin metal plate by press-forming. The peripheral wall of the boss portion 40 is alternately bent inwardly and outwardly in the circumferential direction to form ribs 46 having a rectangular cross-section. The outer periphery of the main portion 42 is tapered to define a receiving portion 421. A ring-shaped damper-mass member 49 is bonded to the outer peripheral surface of the receiving portion 421 via a rubber body 48, having a uniform thickness. The damper-mass member 49 is formed from a ring-shaped thin metal plate by press-forming. V-shaped grooves 491 are formed in the outer peripheral surface of the damper-mass member 49, which extends in parallel to an axial line of boss portion 40. Thus, the damper-mass member 49 serves as a belt retaining portion.

When torsional vibrations are exerted from a rotary shaft (not shown), the damper-mass member 49 resonates therewith to effectively absorb or restrain the torsional vibrations.

With the present embodiment, a sufficient mass of inertia can be obtained because the damper-mass member 49 is positioned outside the main portion 42, and the weight of the pulley can be significantly reduced, because the damper-mass member 49 is also formed of a thin metal plate by press-forming.

As described above, the pulley, provided in accordance with the present invention, can be produced in a simple manner at low cost, and the weight of the pulley can be significantly reduced.

While the invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A pulley comprising:
   a cylindrical boss portion adapted to receive a rotary shaft;
   a ring-shaped belt retaining portion concentrically disposed about said boss portion, said belt retaining portion having belt retaining grooves in an outer peripheral surface thereof; and
   a plate-shaped main portion connecting said boss portion and said belt retaining portion,
   at least said boss portion and said main portion being integrally formed from a metal plate, by press-forming, said boss portion including a plurality of integral ribs which are alternately bent inwardly and outwardly in the circumferential direction thereof.

2. The pulley according to claim 1, wherein said main portion is of an annual shape, and an outer peripheral part of said annular plate-shaped main portion is bent by press-forming so as to have a predetermined width, said outer peripheral part being substantially perpendicular to said annular plate-shaped main portion thereby defining said belt retaining portion, said belt retaining portion extending so as to be parallel with said rotary shaft.

3. The pulley according to claim 1, wherein said boss portion includes first and second portions, said second portion being larger in diameter than said first portion, said first portion being adapted to receive the rotary shaft, said second portion being adapted to receive a nut for securing the pulley to the rotary shaft.

4. The pulley according to claim 1, wherein said ribs have U-shaped cross-sections.

5. The pulley according to claim 1, wherein at least one of said ribs includes a key-way.

6. The pulley according to claim 2, further including a ring-shaped rubber body joined to a planar surface of said main portion so as to be concentric with said boss portion, and a ring-shaped damper-mass member joined to said ring-shaped rubber body.

7. The pulley according to claim 1, wherein said main portion is of an annular shape, an outer peripheral part of said annular plate-shaped main portion being bent so as to have uniform width, thereby defining a receiving portion, said pulley further including a ring-shaped rubber body, said belt retaining portion being joined to said receiving portion so that said ring-shaped rubber body is disposed between said belt retaining portion and said receiving portion.

8. The pulley according to claim 7, wherein said belt retaining portion is formed from a ring-shaped metal plate by press-forming.

* * * * *